(12) United States Patent
Niforatos et al.

(10) Patent No.: US 11,513,355 B2
(45) Date of Patent: Nov. 29, 2022

(54) METHOD AND SYSTEM FOR PERVASIVE MEMORY AUGMENTATION VIA A HEADS-UP DISPLAY

(71) Applicant: North Inc., Kitchener (CA)

(72) Inventors: Evangelos Niforatos, Kitchener (CA); Daniel Perry, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 209 days.

(21) Appl. No.: 16/810,323

(22) Filed: Mar. 5, 2020

(65) Prior Publication Data

US 2020/0292823 A1    Sep. 17, 2020

Related U.S. Application Data

(60) Provisional application No. 62/817,666, filed on Mar. 13, 2019.

(51) Int. Cl.
*G02B 27/01* (2006.01)
*G06F 40/10* (2020.01)
*G06F 1/16* (2006.01)

(52) U.S. Cl.
CPC ......... *G02B 27/0172* (2013.01); *G06F 1/163* (2013.01); *G06F 40/10* (2020.01); *G02B 2027/0174* (2013.01)

(58) Field of Classification Search
CPC ........ G02B 27/0172; G02B 2027/0174; G06F 40/10; G06F 1/163
See application file for complete search history.

(56) References Cited

U.S. PATENT DOCUMENTS

| | | | |
|---|---|---|---|
| 8,825,511 B2* | 9/2014 | Hamilton | G06Q 10/10 705/7.21 |
| 2014/0160157 A1* | 6/2014 | Poulos | G06F 3/011 345/633 |
| 2015/0193379 A1* | 7/2015 | Mehta | G10L 13/00 704/9 |
| 2017/0111882 A1* | 4/2017 | Bang | H04W 68/005 |
| 2017/0346872 A1* | 11/2017 | Naik | G01C 21/3661 |
| 2017/0363874 A1* | 12/2017 | Tricoukes | G02B 27/0176 |
| 2018/0052706 A1* | 2/2018 | Agrawal | G06F 9/461 |
| 2018/0234533 A1* | 8/2018 | Xu | G06F 3/167 |
| 2019/0179421 A1* | 6/2019 | Grover | G06F 3/017 |

* cited by examiner

*Primary Examiner* — Stacy Khoo

(57) ABSTRACT

A method of pervasive memory augmentation includes receiving a request to augment a memory via a heads-up display having a field of view and generating one or more processor-readable memory cues that are connected to the memory. A cued content is generated based on the one or more processor-readable memory cues. The cued content is presented in a display space in the field of view of the heads-up display on a spaced repetition schedule.

20 Claims, 16 Drawing Sheets

- KAYAK IN FIJI
- HIKING IN KIRUNA
- BOSTON MARATHON

- Event 1
- Event 2
- Event 3

Adam Smith
Conf-2/21-8:15
YYZ-2/20-16:50
Sheraton Mass Av
BOS-2/22-13:10

METHOD AND SYSTEM FOR PERVASIVE MEMORY AUGMENTATION VIA A HEADS-UP DISPLAY

CROSS-REFERENCE TO RELATED APPLICATIONS

This application claims the benefit of U.S. Provisional Application No. 62/817,666 filed 13 Mar. 2019, the disclosure of which is incorporated herein by reference in its entirety.

TECHNICAL FIELD

The disclosure generally relates to memory augmentation and use of computer technology for memory augmentation.

BACKGROUND

We are being bombarded with ever increasing amounts of information on a daily basis. In such an atmosphere, it can be difficult to retrieve particular memories when the memories are needed. In the past, we relied on scribbling notes on paper, drawing pictures, taking photos, and the like to help us remember. Today, there are various electronic versions of these memory aids, e.g., Evernote® app, Microsoft OneNote® app, digital cameras and related apps, and electronic calendars. While these electronic memory aids can be helpful, they may create a dependency that leads to people making less effort to use their natural abilities to remember. In some cases, this may mean that certain people are at a disadvantage in situations where they are not allowed to use these electronic memory aids, such as during an examination, or where there is insufficient time to look for certain memories in electronic memory aids, such as when a swift decision must be made during a crisis.

SUMMARY

In a first aspect, a method of pervasive memory augmentation may be summarized as including receiving a request to augment a memory via a WHUD having a field of view and generating one or more processor readable memory cues that are connected to the memory in response to the request, generating a cued content based on the one or more processor readable memory cues, and presenting the cued content in a display space in the field of view of the WHUD on a spaced repetition schedule.

Variants of the method of pervasive memory augmentation according to the first aspect may further include one or more of the features described in A1 to A8 below in any combination.

A1: The cued content may be presented in the display space at equally spaced time intervals over a set time period. Alternatively, the cued content may be presented in the display space at unequally spaced time intervals over a set time period. Alternatively, the cued content may be presented in the display space at progressively expanding time intervals over a set time period.

A2: Presentation of the cued content in the display space on a spaced repetition schedule may begin in response to a subsequent request to begin augmenting the memory.

A3: Apart from presenting the cued content in the display space on the spaced repetition schedule, the cued content may be presented in the display space in response to at least one of (a) a request to present the memory cues, (b) a reminder of an event linked to the memory, and (c) detecting that the WHUD is at a location linked to the memory.

A4: Presentation of the cued content in the display on the spaced repetition schedule may be repeated in response to a request to replay augmentation of the memory.

A5: Memory data that describes the memory may be acquired prior to generating the one or more processor-readable memory cues that are connected to the memory. Acquiring the memory data may include receiving audio data captured in a portion of an environment of the WHUD by at least one microphone during a period in which the memory is made. Generating one or more processor-readable memory cues that are connected to the memory may include causing conversion of the audio text to text data, causing natural language processing of the text data to identify one or more topics and/or keywords in the text data, and causing generation of the one or more processor-readable memory cues from the one or more topics and/or keywords. The audio data may be received from the at least one microphone by a processor of the WHUD and transmitted to a remote device, where a remote processor associated with the remote device generates the one or more processor-readable memory cues. Receiving the audio data from the at least one microphone may include receiving the audio data in segments, where transmitting the audio data to the remote device may include transmitting the audio data to the remote device in segments.

A6: A location information of one or more digital assets connected to the memory may be received. The one or more digital assets may be retrieved using the location information. Generating one or more processor-readable memory cues that are connected to the memory may include generating the one or more processor-readable memory cues from the one or more digital assets. Receiving a location information of one or more digital assets connected to the memory may include presenting a user interface in the display space to receive the location information. Retrieving the one or more digital assets using the location information may include at least one of retrieving a digital asset from an application installed on a host device paired with the WHUD, retrieving a digital asset from an application hosted on at least one remote server, and retrieving a digital asset from a posting on a social network.

A7: Presenting the cued content in the display space on the spaced repetition schedule may include modulating an output light of a display light source with at least a portion of the cued content and projecting the output light to the display space.

A8: The memory indicated in the request to augment a memory may be selected from a memory of a meeting, a memory of a past event, a memory of a future event, a memory of learning material, and a memory of sensitive information.

In a second aspect, a method of pervasive memory augmentation may be summarized as including receiving a request to augment a memory via a WHUD having a field of view and generating one or more processor-readable memory cues in response to the request, generating a cued content based on the one or more processor-readable memory cues, and presenting the cued content in a display space in a field of view of the WHUD in response to at least one of (a) a request to present the memory cues, (b) a reminder of an event linked to the memory, and (c) detecting that the WHUD is at a location linked to the memory.

In a third aspect, a system for pervasive memory augmentation typically includes a WHUD having a field of view, a display light source, a processor communicatively coupled to the display light source, and a non-transitory processor-readable medium communicatively coupled to the processor. The non-transitory processor-readable medium stores data and/or processor-executable instructions that, when executed by the processor, causes the WHUD to perform the method of pervasive memory augmentation described in the first aspect (or a variant thereof).

Variants of the system for pervasive memory augmentation according to the third aspect may further include one or more of the features described in B1 to B3 below in any combination.

B1: At least one sensor may be provided to capture a sensory input in an environment of the WHUD. The at least one sensor may be a microphone.

B2: A support frame that in use is worn on a head of a user may be provided, where the display light source and processor are carried by the support frame.

B3: The display light source may be a scanning laser projector, a micro-display, or a digital light processing projector.

In a fourth aspect, a non-transitory computer-readable storage medium includes computer-executable instructions stored therein that as a result of being executed cause at least one processor to perform the method of pervasive memory augmentation described in the first aspect (or a variant thereof).

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 6B-1 to 6B-6 are schematic diagrams of a display space of a WHUD at various stages of running an application that augments a memory in a reminisce mode.

FIGS. 7B-1 to 7B-6 are schematic diagrams of a display space of a WHUD at various stages of running an application that augments a memory in a learning mode.

FIGS. 8B-1 to 8B-6 are schematic diagrams of a display space of a WHUD at various stages of running an application that augments a memory in a proactivity mode.

FIGS. 9B-1 to 9B-6 are schematic diagrams of a display space of a WHUD at various stages of running an application that augments a memory in a utility mode.

DETAILED DESCRIPTION

Figure 1A:
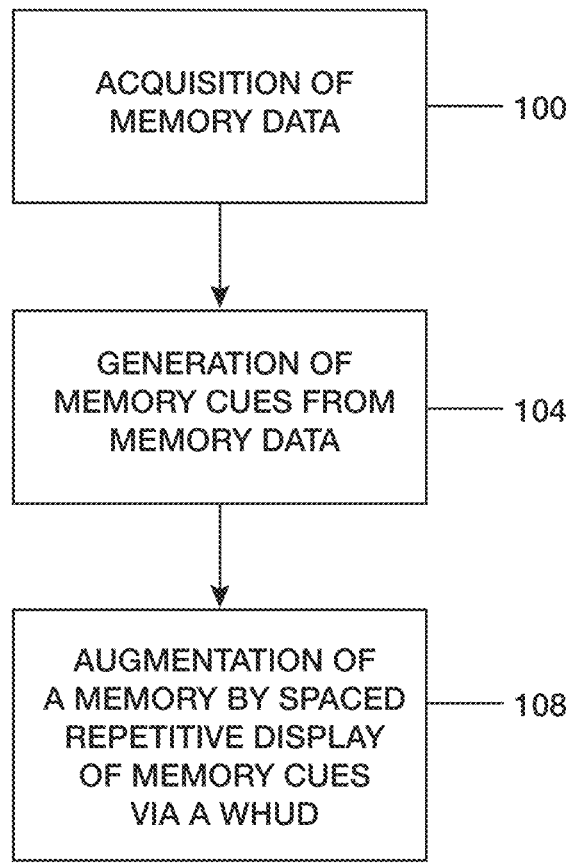
FIG. 1A is a flow diagram illustrating one implementation of a method of pervasive memory augmentation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

The term "digital assets" means, but is not limited to, files, including but not limited to, emails, documents, images, audio, video, and similar digital files which currently exists or may exist as technology develops or such comparable items as technology develops, stored on digital devices, including, but not limited to, desktops, laptops, tablets, peripherals, storage devices, mobile telephones, smartphones, and any similar digital device which currently exists or may exit as technology develops or such comparable items as technology develops, regardless of the ownership of the physical device upon which the digital asset is stored. (Evan Carroll. (30 Jan. 2012). Digital Assets: A Clearer Definition. The Digital Beyond. Retrieved Feb. 22, 2015, from www.thedigitalbeyond.com/2012/01/digital-assets-a-clearer-definition.)

A method of pervasive memory augmentation may be realized through an application that runs in an environment provided by a pervasive computing device having a display, in particular a wearable heads-up display (WHUD). A WHUD is an electronic device that is worn on the head of a user and, when so worn, secures at least one electronic display within a viewable field of at least one of the eyes of the user. In particular, a WHUD enables the user to see displayed content and without preventing the user from being able to see their external environment. The "display" component of a WHUD is either transparent or at a periphery of the user's field of view so that it does not completely block the user from being able to see their environment. Examples of WHUDs include Epson Moverio®, Google Glass®, Microsoft Hololens®, North Focals®, Optinvent Ora®, and Vuzix Blade®.

Figure 1B:
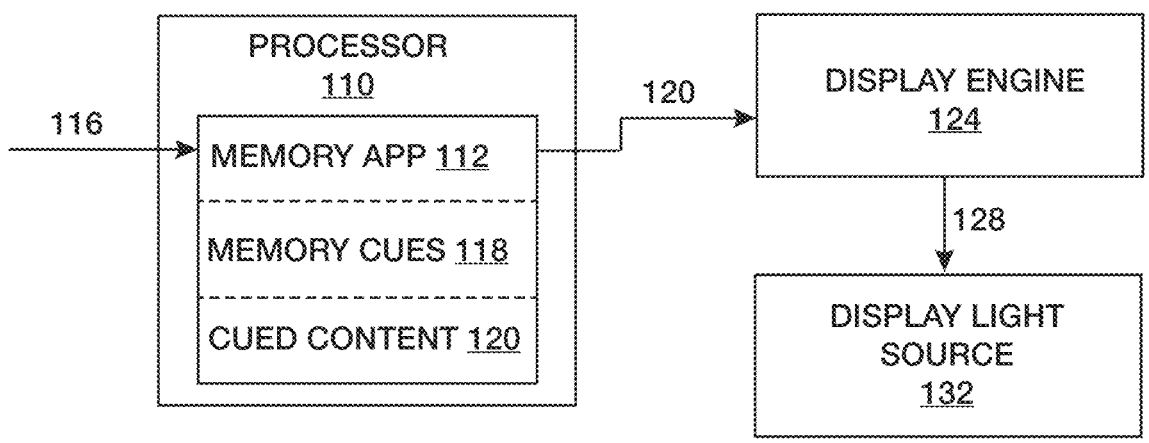
FIG. 1B is a block diagram illustrating input/output of a pervasive memory augmentation application according to one implementation.

For convenience, the application may be called "memory app". FIG. 1A shows that a method of pervasive memory augmentation may generally include acquisition of processor-readable memory data (100), generation of processor-readable memory cues from the processor-readable memory data (104), and augmentation of a memory by spaced repetition display of the processor-readable memory cues via a WHUD (108). FIG. 1B shows a processor 110 of a WHUD running memory app 112. Memory app 112 includes logic to receive processor-readable memory data 116 as input, generate processor-readable memory cues 118, generate display content based on memory cues ("cued content") 120, and output cued content 120 to a display engine 124 of the WHUD. Display engine 124 generates image data (or display light source controls) 128 based on cued content 120 and provides the image data (or display light source controls) 128 to a display light source 132 of the WHUD, resulting in display of the cued content in a display space in a field of view of the WHUD.

Given a memory M to be augmented, the processor-readable memory data 116 contains information connected to memory M. Processor-readable memory data 116 may include one or more of text data, image data, audio data, and video data, depending on the context of memory M. Processor-readable memory data 116 may be acquired (100 in FIG. 1A) while memory M is made or may be curated from other processor-readable data (digital assets) containing information that describes memory M. In some examples, processor-readable memory data 116 may be acquired via the WHUD while memory M is made. Since processor-readable memory data 116 contains information connected to memory M, processor-readable memory cues 118 generated from memory data 116 will be connected to memory M. In examples where processor-readable memory data 116 is acquired via the WHUD while memory M is made, memory cues 18 may be generated while the memory data is acquired or subsequent to acquiring the memory data.

In examples, processor-readable memory cues 118 may be stored in a memory of WHUD at least during a period in which memory M is augmented by spaced repetition display of the memory cues via the WHUD (108 in FIG. 1A). The term "spaced repetition display" generally means presenting the processor-readable memory cues 118 in a display space in a field of view of the WHUD on a spaced repetition schedule. That is, memory app 112 has a loop running on some schedule, and for each iteration of the loop an instance of cued content 120 is provided to display engine 124 of the WHUD, and each successive instance of cued content 120 provided to display engine 124 is temporally separated from a preceding instance of cued content 120 provided to display engine 124. Memory retrieval with the help of cues is known as "cued recall", which differs from free recall that does not rely on cues that are connected to the recalled memory. By displaying the memory cues connected to memory M to the user at spaced repetition, the ability of the user to recall memory M is expected to improve. Memory app 112 may also learn what spaced repetition schedule is effective for a user for a particular type of memory to be augmented, effectively personalizing the cued recall for the user.

Figure 2:
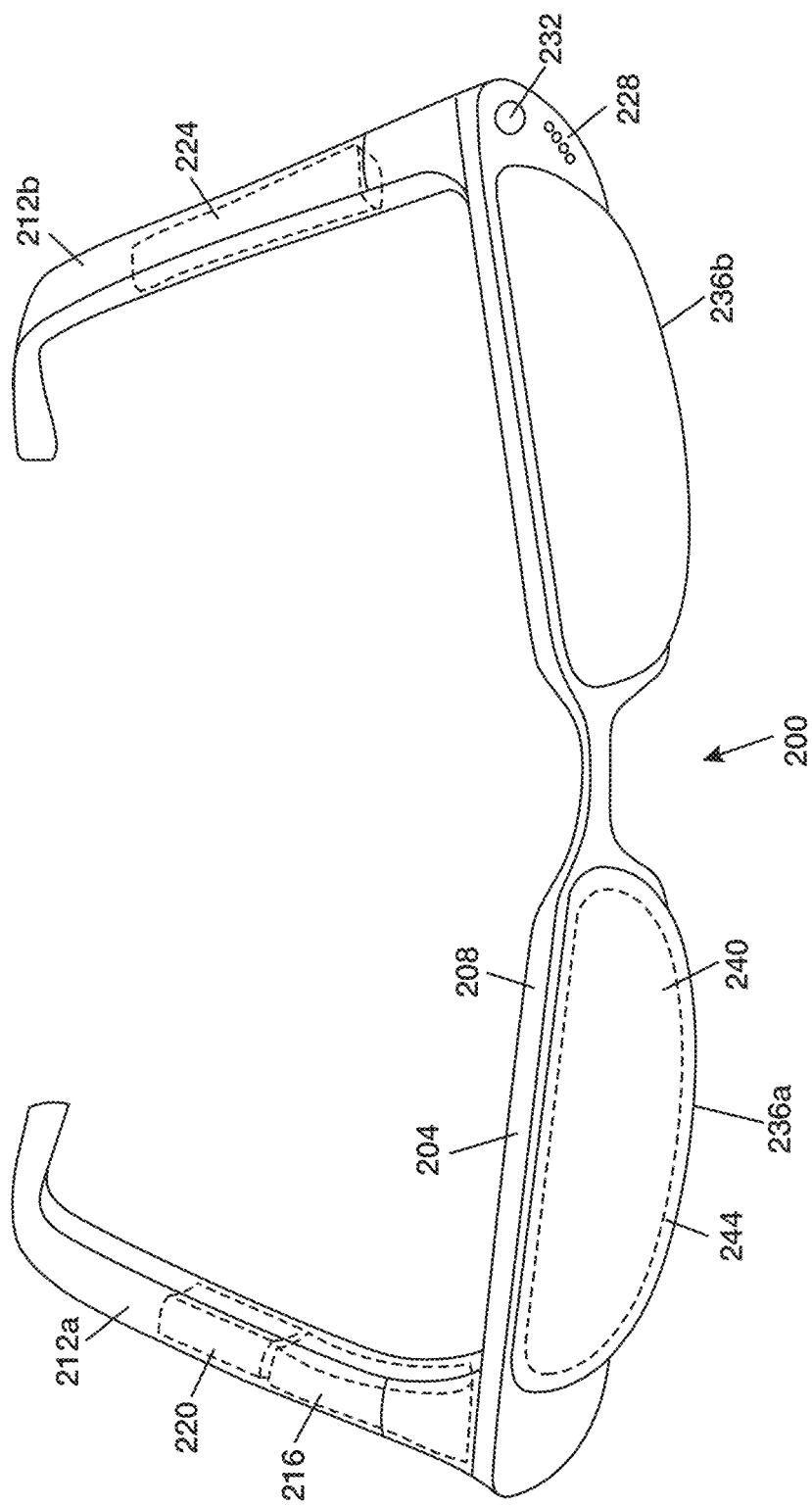
FIG. 2 is a perspective view of a wearable heads-up display (WHUD) according to one example.

FIG. 2 illustrates an example WHUD 200 that may be used to practice the method of pervasive memory augmentation. WHUD 200 is shown as a wearable having an appearance of glasses. In general, WHUD 200 may take on any form that can be worn on the head and that would enable a user to view display content without blocking the user's natural view of the real world. In examples, WHUD 200 may be a retinal display that projects light carrying an image to the retina of the user. The user will have a perception of seeing an image on a display screen floating in space some distance in front of the eye. However, in reality the image is on the retina and not on a display screen. Alternatively, the memory app may run in an environment provided by other types of heads-up displays, such as those that place a micro-display near the eye, e.g., GOOGLE GLASS.

In one example, WHUD 200 includes a support frame 204 that carries the devices, electronics, and software that enable WHUD 200 to display content. In one example, support frame 204 includes a frame front 208 and temples 212a, 212b attached to opposite sides of frame front 208. Many of the components of WHUD 200, e.g., display light source 216, electronics module 220, and battery 224, are carried by or within temples 212a, 212b. Electronics module 220 may include processor(s), memory (or processor-readable medium), communication device(s), and other hardware. Frame front 208 may carry power, data, and communication structures, such as conductors and antenna, to enable power, data, and communication signals to be received or transmitted by components carried by or within temples 212a, 212b and frame front 208. Frame front 208 may carry various input/output (I/O) devices (or sensors) to enable various I/O functionalities of WHUD 200. For example, frame front 208 may carry at least one microphone 228 to capture audio from the environment of WHUD 200. Frame front 208 may also carry at least one camera 232 to capture images from the environment of WHUD 200.

Frame front 208 carries eyeglass lenses 236a, 236b. In one example, at least the eyeglass lens closest to display light source 216, in this case eyeglass lens 236a, is a combiner lens, i.e., a lens including a combiner integrated with at least one lens. In the example shown in FIG. 2, eyeglass lens 236a includes a combiner 240 integrated with lens 244. For example, combiner 240 may be embedded in or attached to lens 240. In another example (not shown), eyeglass lens 236a may include combiner 240 integrated with two lenses. This integration may include interposing combiner 240 between the two lenses, embedding combiner 240 in at least one of the two lenses, or attaching combiner 240 to at least one of the two lenses. Combiner 240 may be a free-space combiner or a substrate-guided combiner. A free-space combiner uses one or more reflective, refractive, or diffractive optical elements to redirect light from a light source to a target. An example of a free-space combiner is a holographic optical element that uses one or more holograms to redirect light. A substrate-guided combiner uses a lightguide or waveguide ("lightguide") and total internal reflection to redirect light from a light source to a target. Light enters the lightguide, typically through an in-coupling element, propagates along the length of the lightguide by total internal reflection, and exits the lightguide through an out-coupling element. The in/out-coupling elements may be diffraction gratings, prisms, and the like. There may be additional optical elements, such as gratings, in the lightguide to redirect light within the lightguide.

Figure 3:
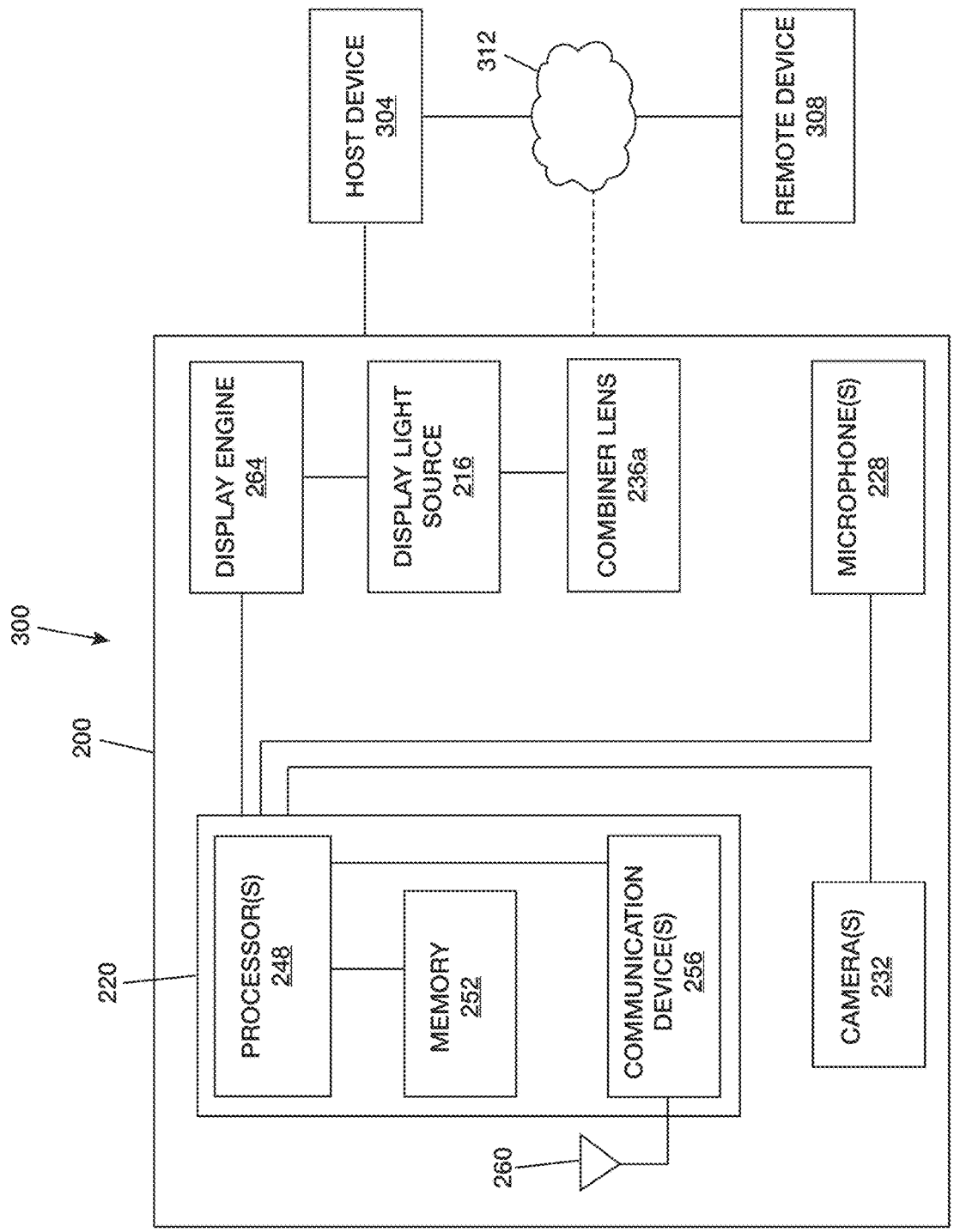
FIG. 3 is a schematic diagram showing a system for pervasive memory augmentation according to one implementation.

FIG. 3 shows a system 300 for pervasive memory augmentation according to one illustrative implementation. System 300 includes WHUD display light source 216. Display light source 216 may be scanning laser projector, organic light-emitting diode (OLED) micro-display, liquid crystal on silicon (LCOS) micro-display, digital light processing (DLP) display, or other display light source suitable for use in a WHUD. System 300 includes WHUD combiner lens 236a that receives light projected by display light source 216. System 300 may include WHUD I/O devices, e.g., microphone 228 and/or camera 232. System 300 includes various components from WHUD electronics module 220, such as processor(s) 248, memory 252, and communication device(s) 256. System 300 may include antenna 260 that is connected to communication device 256. Processor 248 may be, for example, a central processing unit (CPU), a microprocessor, a controller, an application specific integrated circuit (ASIC), system on chip (SOC), or a field-programmable gate array (FPGA). Memory 252 is a non-transitory processor-readable medium that can store instructions, logic, or programs, including, but not limited to, non-volatile or volatile memory, read only memory (ROM) random access memory (RAM), FLASH memory, registers, magnetic hard disk, optical disk, or any combination of these components.

In one implementation, processor 248 may communicate with a host device 304 to access resources on host device 304. Host device 304 may be a smart phone or tablet or other portable computing device operating near WHUD 200. Processor 248 may communicate with host device 304 through a personal area network (PAN) established between communication device 256 that implements a wireless PAN technology, such as BLUETOOTH or BLUETOOTH LOW ENERGY (BLE), and a wireless communication device of host device 304. Host device 304 may communicate with a remote device 308 over a network 312. Processor 248 through communication with host device 304 may access resources or services on remote device 308. Alternatively, processor 248 may communicate with remote device 308 through network 312, i.e., without first communicating with host device 304. In this case, communication device(s) 256 may implement a wireless local area network (WLAN) standard, such as IEEE 802.11x (otherwise known as Wi-Fi), or a mobile communications standard, such as 3G, 4G, 4G LTE, or 5G, to enable communication between processor 248 and network 312. Remote device 308 may be a server, which may be part of a network of servers, and may include at least one "remote processor".

Processor 248 is communicatively coupled to memory 252, display engine 264, and I/O devices, e.g., microphone 228 and camera 232. Processor 248 may communicate with display light (DLS) 216 through display engine 264. Display engine 264 may include controller(s) and driver(s) to generate controls for components of DLS 216. For example, if DLS 216 is a scanning laser projector, display engine 264 may include a laser driver and a scan mirror driver. Processor 248 may execute logic or instructions stored in memory 252. For example, the memory app may be stored in memory 252 and may be executed by processor 248 to provide pervasive memory augmentation (see memory app 112 and processor 110 in FIG. 1B). Processor 248 may provide display content to DLS 216, which may generate and project light corresponding to the display content to combiner lens 236a, and combiner lens 236a may redirect the light to an exit pupil. A user wearing WHUD 200 may receive the light redirected to the exit pupil and thereby view the display content. In one example, processor 248 may receive data from I/O devices, e.g., microphone 228 and camera 232. Processor 248 may store such data in memory 252 for later processing or may process the data immediately. Processor 248 may transmit the data, or portions thereof, to remote device 308 for processing, and remote device 308 may return data to processor 248.

Returning to FIGS. 1A and 1B, the memory app (112 in FIG. 1B) may have different modes based on the type of memory to be augmented, e.g., episodic memory, semantic memory, or procedural memory, or based on use cases, e.g., meeting, learning, behavior change, and others. For the different memory modes, the method of acquiring processor-readable memory data (100 in FIG. 1A) and the method of generating processor-readable memory cues from the processor-readable memory data (104 in FIG. 1A) may be different in implementation. However, the method of augmenting memory by spaced repetition display of the processor-readable memory cues via a WHUD (108 in FIG. 1A) will generally be the same in implementation for all the memory modes. For this reason, a method of spaced repetition display of processor-readable memory cues via a WHUD will be described first. Then, examples of memory modes using the method of spaced repetition display of processor-readable memory cues will be described.

Figure 4:
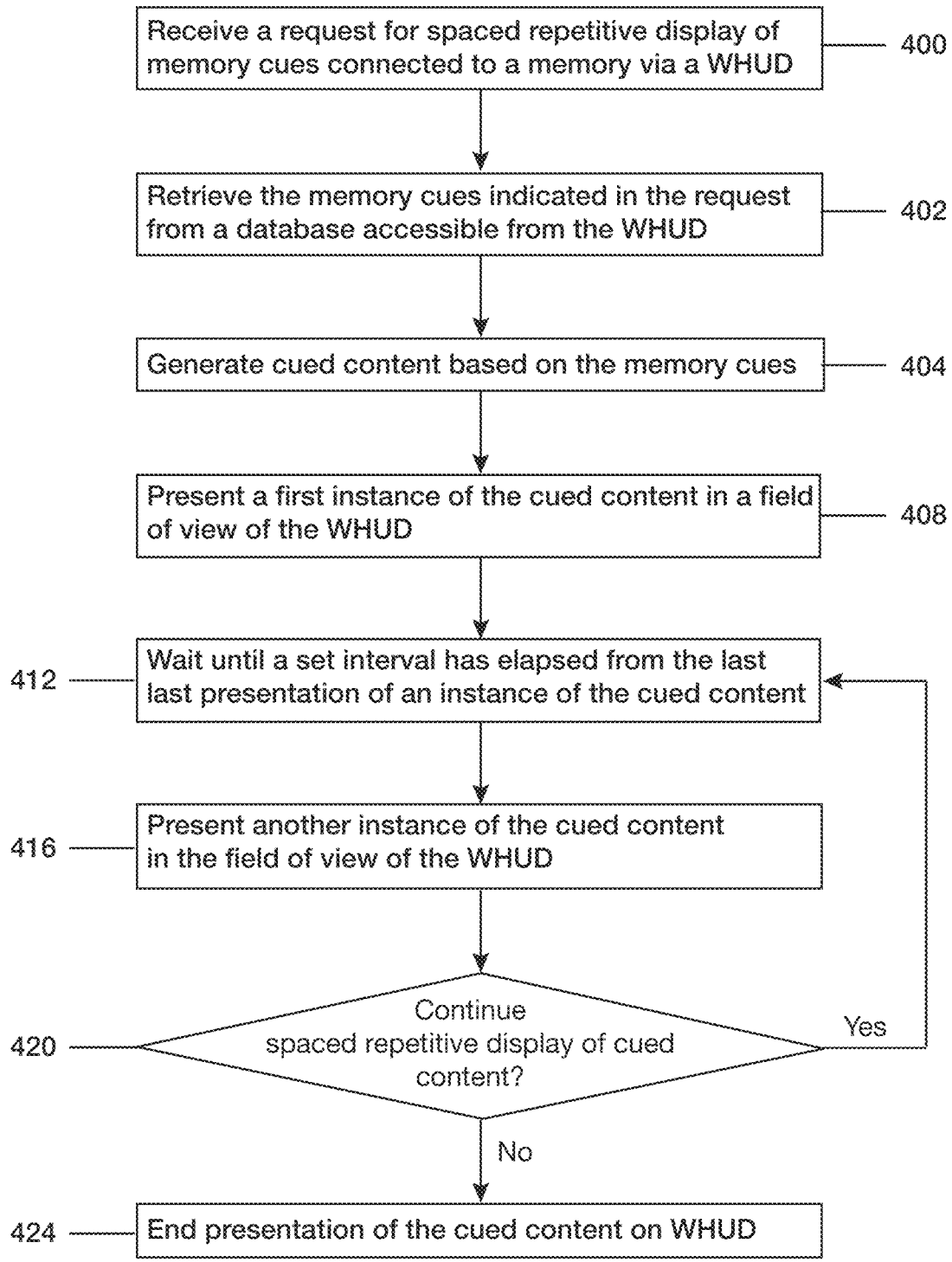
FIG. 4 is a flow chart illustrating one implementation of a method of spaced repetition display of processor-readable memory cues via a WHUD.

FIG. 4 is a flow chart illustrating a method of spaced repetition display of processor-readable memory cues via a WHUD (108 in FIG. 1A). At 400, the processor (110 in FIG. 1B; 248 in FIG. 3) of the WHUD receives a request for spaced repetitive display of memory cues connected to a memory M via the WHUD. At 402, the processor retrieves the memory cues related to the memory M from a database. The database may be in a memory (252 in FIG. 3) of WHUD or other memory accessible by the processor. The memory cues may be any combination of words, pictograms, photos, and video clips. At 404, the processor generates cued content using the memory cues. The cued content may be in the form of a single notification or a sequence of notifications that may be displayed via a notification system of the WHUD. Generating the cued content may include determining how many memory cues may be fitted in a display space of the WHUD without overcrowding the field of view. If there are too many memory cues to be fitted into the display space at once, the processor may divide the memory cues into groups. Thus, in general, each notification included in the cued content may include all of the memory cues or a portion of the memory cues. If the cued content is in the form of a sequence of notifications, generating the cued content may include determining where in the sequence of notifications each memory cue should appear. Generating the cued content may also include restricting the number of memory cues to include in the cued content, e.g., in order to limit the cued content to a single notification or a small number of notifications. The memory cues may have associated metadata, such as ranking or timestamp, which may enable the processor to determine which memory cues could be excluded from the cued content. In the cued content, the arrangement of the memory cues may be ordered, e.g., by the time in which they occurred in the memory or by semantics, or may be random.

At 408-420, the cued content is presented in the display space of the WHUD repeatedly at spaced time intervals or on a spaced repetition schedule. That is, the cued content is displayed at each of times $t_1, t_2, t_3, \ldots, t_n$. The cued content may be displayed at equally spaced repetition time intervals, i.e., $d=t_{k+1}-t_k$, where d is constant for k=1 to n−1. Alternatively, the cued content may be displayed at unequally spaced repetition time intervals. One example of unequally spaced repetition time intervals is progressively expanding spaced repetition time intervals, i.e., $d(k)=t_{k+1}-t_k$, where d(k) increases with k for k=1 to n−1. That is, the cued content is displayed more frequently at the beginning of the spaced repetition display and less frequently near the end of the spaced repetition display. At 408, a first instance of the cued content is presented in the display space of the WHUD. At 412, the processor waits for a set interval (d or d(k)) from the last presentation of an instance of the cued content. At 416, once the wait period is over, another instance of the cued content is presented in the display space of the WHUD. At 420, the processor determines whether to continue spaced repetition display of the memory cues. If the processor determines that spaced repetition display of the memory cues should continue, the processor returns to wait for the set interval from the last presentation of an instance of the cued content to elapse, as indicated at 412, and then presents another instance of the cued content in the display space, as indicated at 416.

The set interval between display of two successive instances of the cued content, i.e., the wait period at 412, may be a few minutes, e.g., 10 to 15 minutes, or a few hours, e.g., 12 hours to 24 hours, or a few days. In general, the set interval may depend on the type of memory to be augmented. In some examples, the processor may receive the set interval as input. For example, the memory app may have a default set interval per memory mode. The memory app may further allow the user to override the default set interval. Thus the processor may receive the modified set interval as input. Alternatively, there may be a feedback loop that measures the effectiveness of memory augmentation per mode and that dynamically adjusts the set interval until an optimum set interval is achieved for the mode. In the case of displaying cued content instances at progressively expanding repetition intervals, a minimum set interval and a maximum set interval may be specified. With the minimum set interval and the maximum set interval and a set time period for augmenting the memory, the expanding rate of the spaced repetition may be determined by the processor. The time period for augmenting the memory may be based on empirical data for the type of memory being augmented. In addition, the time period for augmenting the memory may be learned and improved as the user interacts with the memory app.

The processor may set a memory augmentation flag to true prior to 408. After each 416, the processor may update the running time of the spaced repetition display, i.e., the difference between the time of the most recent execution of 416 and the time of execution of 408. If the running time is equal to or exceeds the set time period for augmenting the memory, the processor may set the memory augmentation flag to false. The processor may also set the memory augmentation flag to false in response to a request, e.g., from the user, to stop memory augmentation. If at 420 the processor determines that memory augmentation should not continue, e.g., because the memory augmentation flag is set to false, the processor stops presenting instances of the cued content in the display space, as indicated at 424.

Earlier it was mentioned that the cued content could include a set of notifications. In one scheme, for each instance of the cued content presented in the display space, all of the notifications in the set are presented in the display space in sequence. In another scheme, for each instance of the cued content presented, only a portion of the notifications in the set is presented. For example, the cued content may include a set of notifications N1, N2, N3, and N4. According to this other scheme, for each instance of cued content presented in the display space, one of the notifications may be selected for presentation while the others are not presented. For the next instance, another one of the notifications may be selected for presentation, while the others are not presented. The selection of which portion of the set of notifications is displayed per instance of cued content presented in the display space may be random or ordered. This other scheme may be used if the memory cues are videos and/or photos, for example, and fitting several of these into the time space reasonable for notifications would be a challenge. Thus, each of displaying a first instance of the cued content at 408 and displaying another instance of the cued content at 416 may mean displaying at least a portion of the cued content.

Each instance of the cued content may be displayed in the form of one or more notifications. In general, notifications are used on electronic devices to get the attention of the user and present the user with information. Any system of presenting notifications on a WHUD may be used to present the cued content in a display space of the WHUD. In some cases, the notification system of the WHUD may be set up such that notifications are not displayed in the display space if the user is engaged in certain activities, such as face-to-face conversation with another person, or at certain times of the day, e.g., in the middle of the might, or when the user has set the system to "do not disturb" mode. Display of the cued content instances in the display space may be paused when notifications are not allowed. Display of the cued content instances may resume according to schedule when notifications are allowed. The running time of the spaced repetition display may be paused while notifications are paused so that the paused time does not eat into the set time period for augmenting the memory. In this case, the memory app may detect a period in which notification is not allowed and adjust the running time for augmenting the memory accordingly.

Different memories with different modes may be augmented in parallel. That is, it is possible to augment memory M1 in a first memory mode and memory M2 in a second memory mode in parallel. In the case of augmenting two memories M1 and M2, for example, in parallel, the processor may create two memory augmentation processes—one memory augmentation process will follow 400 to 424 using the memory cues and interval settings for memory M1 and the other memory augmentation process will follow 400 to 424 using memory cues and interval settings for memory M2.

Figure 5A:
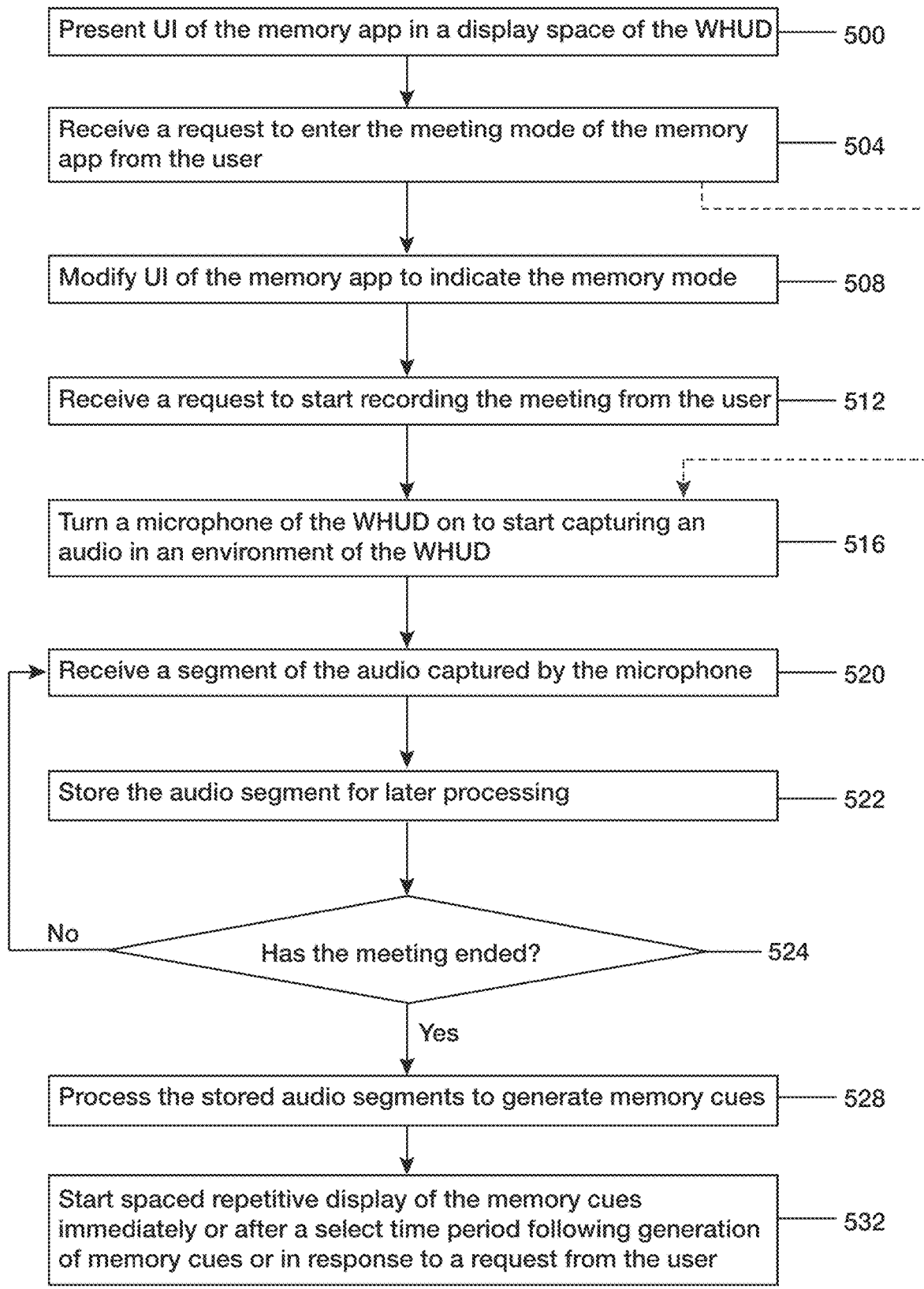
FIG. 5A is a flow chart illustrating one implementation of a method of augmenting a memory of a meeting.
Figures 1, 5B:
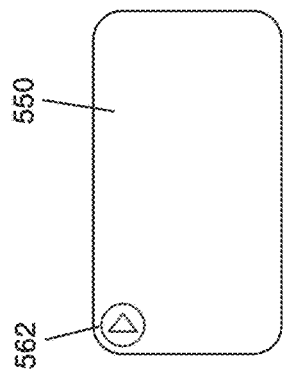
FIGS. 5B-1 to 5B-7 are schematic diagrams of a display space of a WHUD at various stages of running an application that augments a memory in a meeting mode.
Figures 2, 5B:
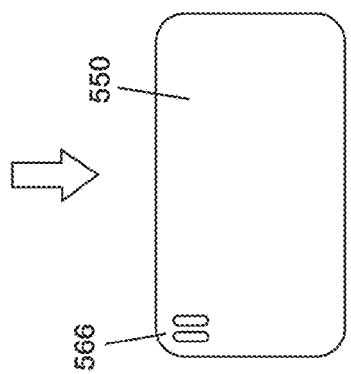
Figures 3, 5B:
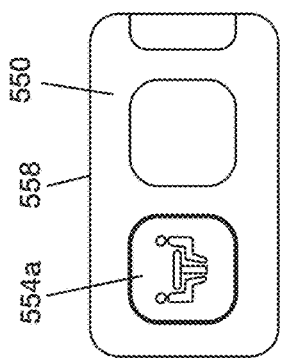
Figures 4, 5B:
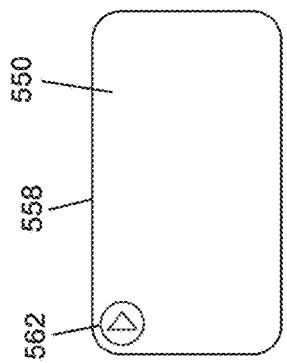

FIG. 5A is a flow diagram illustrating a method of augmenting a memory of a meeting, corresponding to "meeting mode" of the memory app. The meeting may be a private meeting or a public meeting. At 500, a user interface (UI) of the memory app is presented in a display space in a field of view of the WHUD. The UI may be presented in response to the user accessing the memory app. Alternatively, the memory app running in the background may detect that the user is in an environment where the memory app could be useful and may automatically present the UI. For example, if the WHUD implements a service that detects conversations, the memory app may receive a notification that the user is engaging in a conversation, which may trigger presentation of the UI of the memory app in the display space of the WHUD. FIG. 5B-1 shows an example UI 550 with a set of icons 554 in a display space 558 of the WHUD. The user may select any of the icons in the set 554 to activate a corresponding mode of the memory app. The user may select an icon using any supported method of interacting with a UI in a display space of the WHUD, such as by a portable input device, gaze selection, or voice command. FIG. 5B-2 shows that the icon 554*a* corresponding to the meeting mode has been selected.

Returning to FIG. 5A, at 504, the processor receives a request to enter the meeting mode from the user. At 508, in response to the request to enter the meeting mode, the processor may modify the UI of the memory app in the display space of the WHUD to indicate the memory mode. For example, as shown in FIG. 5B-3, the processor may modify the UI of the memory app to show a record icon 562. The user then has the option of selecting the record icon when the user desires that recording of the meeting should start. Returning to FIG. 5A, at 512, the processor receives a request to start recording the meeting, e.g., when the user selects the record icon. At 516, in response to the request to start recording the meeting, the processor turns the microphone on, if the microphone is not already on, which starts capturing of audio in an environment of the user. In an alternate example, 508 and 512 may be bypassed, i.e., the processor may perform 516 in response to receiving a request to enter the meeting mode at 504, as shown by dashed line running from 504 to 516. However, this may give the user less control over which portion of the meeting is recorded while the meeting app is in the meeting mode.

Figures 5, 5B:
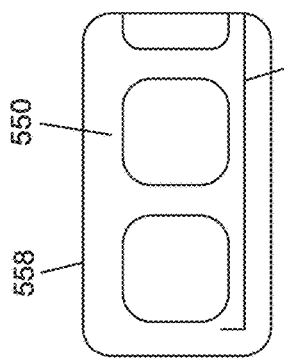
Figures 5, 5B, 6:
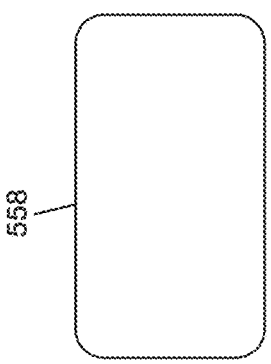
Figures 5, 5B, 6, 7:
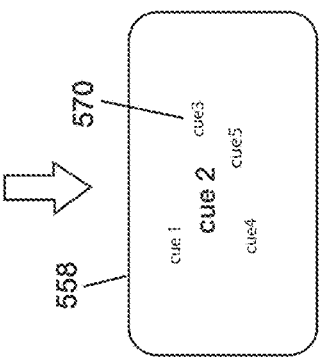

In the context of giving the user more control over which portion of the meeting is recorded, FIG. 5B-4 shows that the processor may modify the UI of the memory app to display a pause icon 566 during recording of the meeting. The user may select the pause icon 566 to pause recording of the meeting. When the user selects the pause icon 566, the processor may stop receiving audio captured by the microphone or may continue to receive the audio but add an ignore processing flag to the portion of the audio received while recording is paused. In addition, the processor may modify the UI of the memory app to display the record icon 562 while recording of the meeting is paused, as shown in FIG. 5B-5. The user may select the record icon 562 when the user wishes to resume recording of the meeting. If the user does not select the record icon 562 within a determined period following selection of the pause icon (566 in FIG. 5B-4), the processor may determine that the user no longer wishes to record the meeting and may hide the record icon 562 to signal the end of recording the meeting, as shown at FIG. 5B-6.

Returning to FIG. 5A, the processor may receive the audio data captured by the microphone in segments, e.g., 30-second segments, over the period in which the meeting mode is active. At 520, the processor receives a segment of the audio data captured by the microphone. At 522, the processor stores the audio segment. At 524, the processor determines if the meeting has ended. If the meeting has not ended, the processor receives another segment of the audio data, as indicated at 520. If the meeting has ended, the stored audio segments are processed to generate memory cues, as indicated at 520. End of meeting may be via a request from the user or may be inferred by the processor, e.g., if the processor receives a Pause Record request and does not receive a subsequent Record request within a predetermined period, the processor may infer that the meeting has ended or that the user no longer wishes to record the meeting. Any other action that closes the UI of the memory app may also signify that the meeting has ended. At 532, the processor starts spaced repetition display of the memory cues. In one example, the processor may initiate spaced repetition display of the memory cues immediately after the memory cues have been generated. In another example, the processor may wait for a select time period after the memory cues have been generated before initiating spaced repetition display of the memory cues. In yet another example, the processor may wait for a request from the user before initiating the spaced repetition display of the memory cues. Spaced repetition display of the memory cues at 532 may follow the acts described in FIG. 4. FIG. 5B shows memory cues presented in a display space of the WHUD, for illustrative purposes.

Figure 5C:
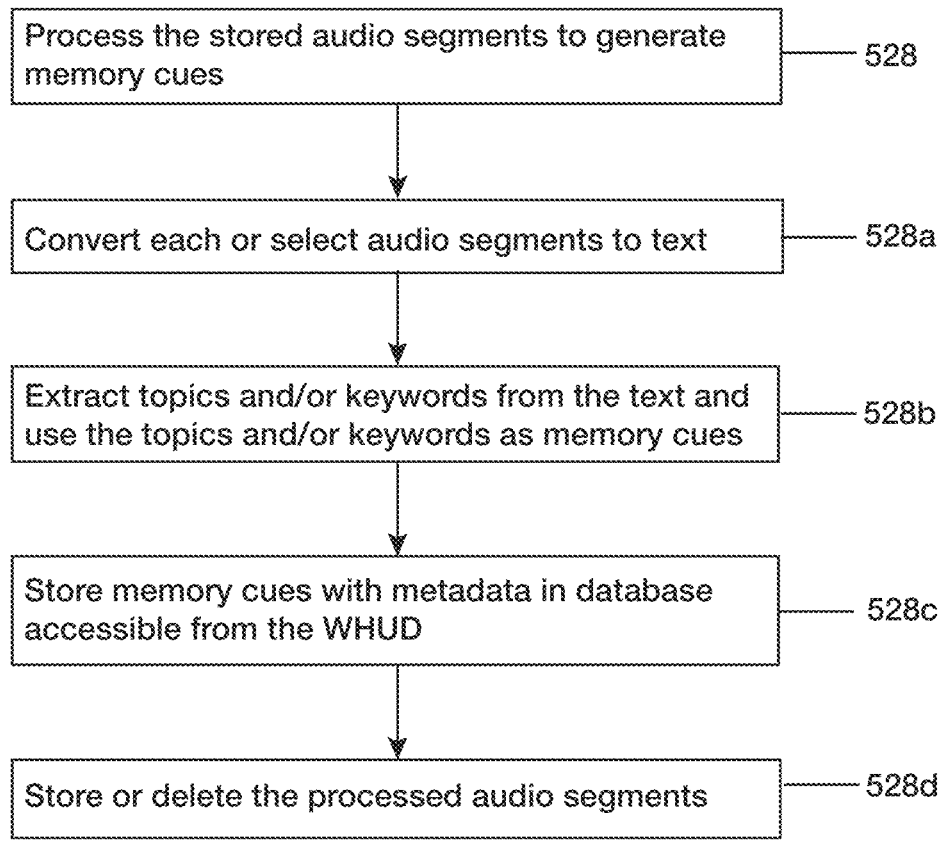
FIG. 5C is a flow chart illustrating one implementation of a method of processing audio segments to generate memory cues.

Returning to FIG. 5A, at 528, the processor of the WHUD may process the audio segments to generate memory cues or may send the audio segments with metadata to a remote processor for processing and receive the memory cues from the remote processor. FIG. 5C illustrates the acts that may be performed at 528 for each audio segment. At 528*a*, the audio segments are converted to text using a Speech to Text API, such as Google Speech to Text API or Watson Speech to Text. At 528*b*, topics can be extracted from the text using natural language processing (NLP) such as Latent Dirichlet Allocation and/or keywords can be extracted from the text using an NLP algorithm such as Rapid Automatic Keyword Extraction (RAKE) algorithm. The topics and/or keywords may be used as memory cues. The memory cues may be single words, bigrams, or sentences. At 528*c*, the memory cues are stored in a database along with metadata, such as the time, data, and location of the recording of the audio segment. At 528*d*, the audio segment may be deleted or destroyed once the memory cues have been extracted from the audio segment, e.g., for privacy reasons or memory space reasons. Alternatively, selected audio segments may be retained while others are deleted. The retained audio segments may become digital assets that can be used for other purposes.

Figure 5D:
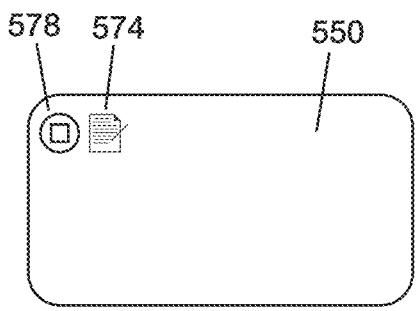
FIG. 5D is a schematic diagram of a display space of a WHUD at a stage of running an application that augments a memory in a meeting mode.

In another implementation, all of the meeting may be captured in audio. During capturing of audio segments of the meeting, the processor may receive a request from the user that indicates a desire to augment a memory of a specific portion of the meeting. For discussion purposes, the request may be called a "Note That" request. The user may make the Note That request using any suitable method, such as by pressing a button on a portable input device that is paired with the WHUD or by voice command. In one example, as shown in FIG. 5D, the memory app UI 550 presented to the user may include a Note That icon 574 that could be selected to indicate a desire to note a specific portion of a meeting. The user may use an input device to select the Note That icon 574. In this case, the Pause icon (566 in FIG. 5B-4) may not be needed. A Stop icon 578 may be displayed instead during recording of the meeting, and the user may select the Stop icon 578 to indicate the end of the meeting. When the processor receives a Note That request from the user, the processor will mark one or more audio segments that overlap with the request with a Note That tag. The audio segment(s) marked could be the audio segment received just before the Note That request or may be the audio segment received just after the Note That request or may be both the audio segment received before the Note That request and the audio segment received after the Note That request. At act 528a in FIG. 5C, the audio segments converted to text may be limited to the ones marked with the Note That tag.

Figure 6A:
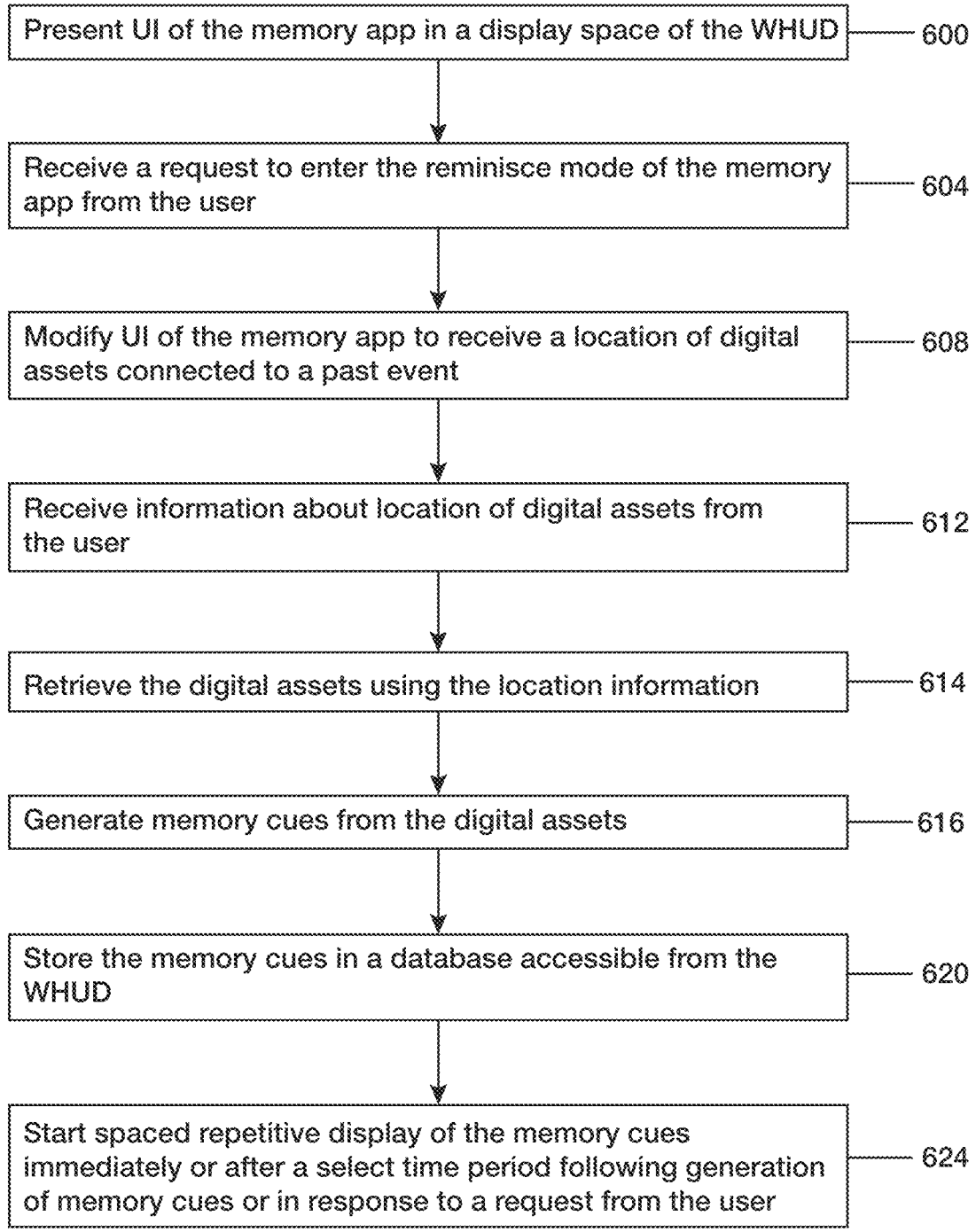
FIG. 6A is a flow chart illustrating one implementation of a method of augmenting a memory of a past event.
Figures 1, 6B:
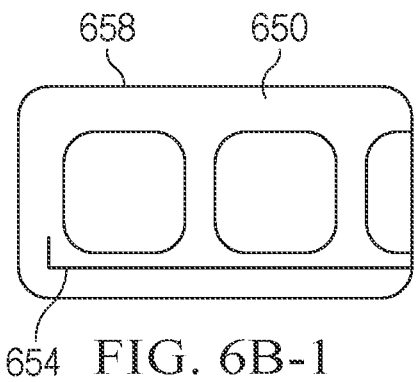
Figures 2, 6B:
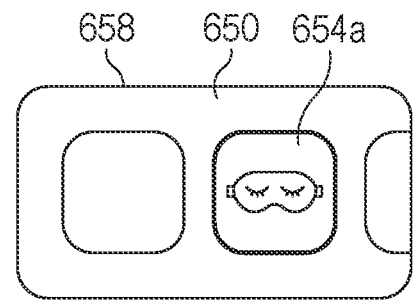
Figures 4, 6B:
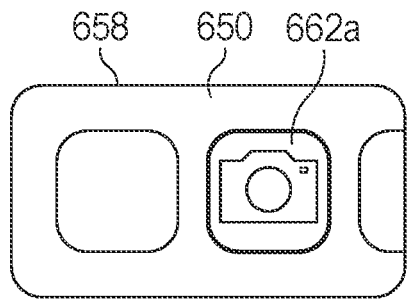
Figures 3, 6B:
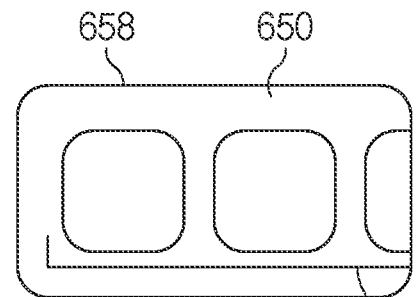
Figures 5, 6B:
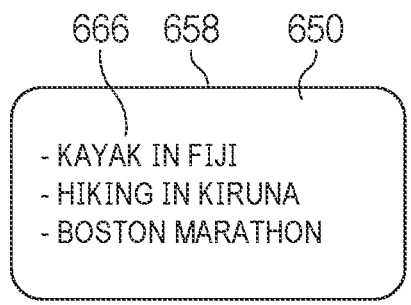
Figures 6, 6B:
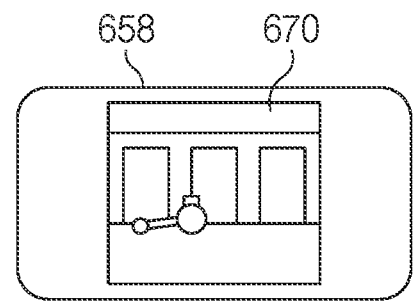

FIG. 6A is a flow chart illustrating a method of augmenting a memory of a past event, corresponding to "reminisce mode" of the memory app. At 600, a user interface (UI) of memory app is presented in the display space of the WHUD in the same manner described above for 500 in FIG. 5A. FIG. 6B-1 shows example UI 650 with a set of icons 654 in the display space 658 of WHUD. FIG. 6B-2 shows that an icon 654a corresponding to the reminisce mode has been selected. Returning to FIG. 6A, at 604, the processor receives a request to enter the reminisce mode. For the reminisce mode, the memory app needs to acquire digital assets connected to the past event for memory data. The digital assets may be any combination of images, videos, and audio. The digital assets may be in any location that may be accessed via an appropriate API. For example, the digital assets may be in a repository connected to a camera app on a host device, or in a repository connected to a photo app running on remote server(s), such as Google Photos, or in a folder in a cloud storage, such as Dropbox or Box, or in postings connected to an account on a social network, such as Instagram or Twitter. At 608, in response to the request to enter the reminisce mode, the processor may modify the memory app UI to allow the user to specify the location of the digital assets connected to the past event.

There are various ways of modifying the UI of the memory app to allow the user to specify the location of the digital assets. For example, as shown in FIG. 6B-3, the processor may modify the memory app UI 650 to show a set of icons 662 that represent applications from which the user may choose to access digital assets. The user may select a desired application from the set. For example, as shown in FIG. 6B-4, the user may select an icon 662a for a camera app having access to digital assets on a host device. In response to a selection that the user makes, the processor may further modify the memory app UI 650 to identify the digital assets of interest. For example, if the user selected the camera app icon 662a, the processor may request a list of albums from the camera app on a host device that is paired with the WHUD, i.e., a host device that is in communication with WHUD via a PAN. The processor may receive the list of albums and modify the memory app UI 650 with the list, as illustrated at 666 in FIG. 6B-5. If the user selects a cloud storage app instead, the processor may request a list of folders from the cloud storage app and modify the memory app UI with the list. If the user selects a connected social network app, the processor may modify the memory app UI to request more information that would allow the processor to identify the relevant postings containing the digital assets of interest on the social network.

Returning to FIG. 6A, at 612, the processor receives information about the location of the digital assets connected to the past event. At 614, the processor retrieves the digital assets. At 616, the processor generates memory cues from the digital assets. Each memory cue may be one of the digital assets or a portion of one of the digital assets. For example, if a digital asset is a video, a memory may be the entire video or just a clip of the video. The processor may select a portion of the digital assets for generation of the memory cues. At 620, the memory cues are stored in a database. At 624, spaced repetition display of the memory cues is used to augment memory of the past event. Spaced repetition display of the memory cues may begin as soon as or after a predetermined waiting period following generation of the memory cues, or spaced repetition display of the memory cues may begin in response to a request from the user. Spaced repetition display of the memory cues may follow the acts described in FIG. 4. FIG. 6B-6 shows sample cued content 670 in the display space of the WHUD, for illustrative purposes.

Figure 7A:
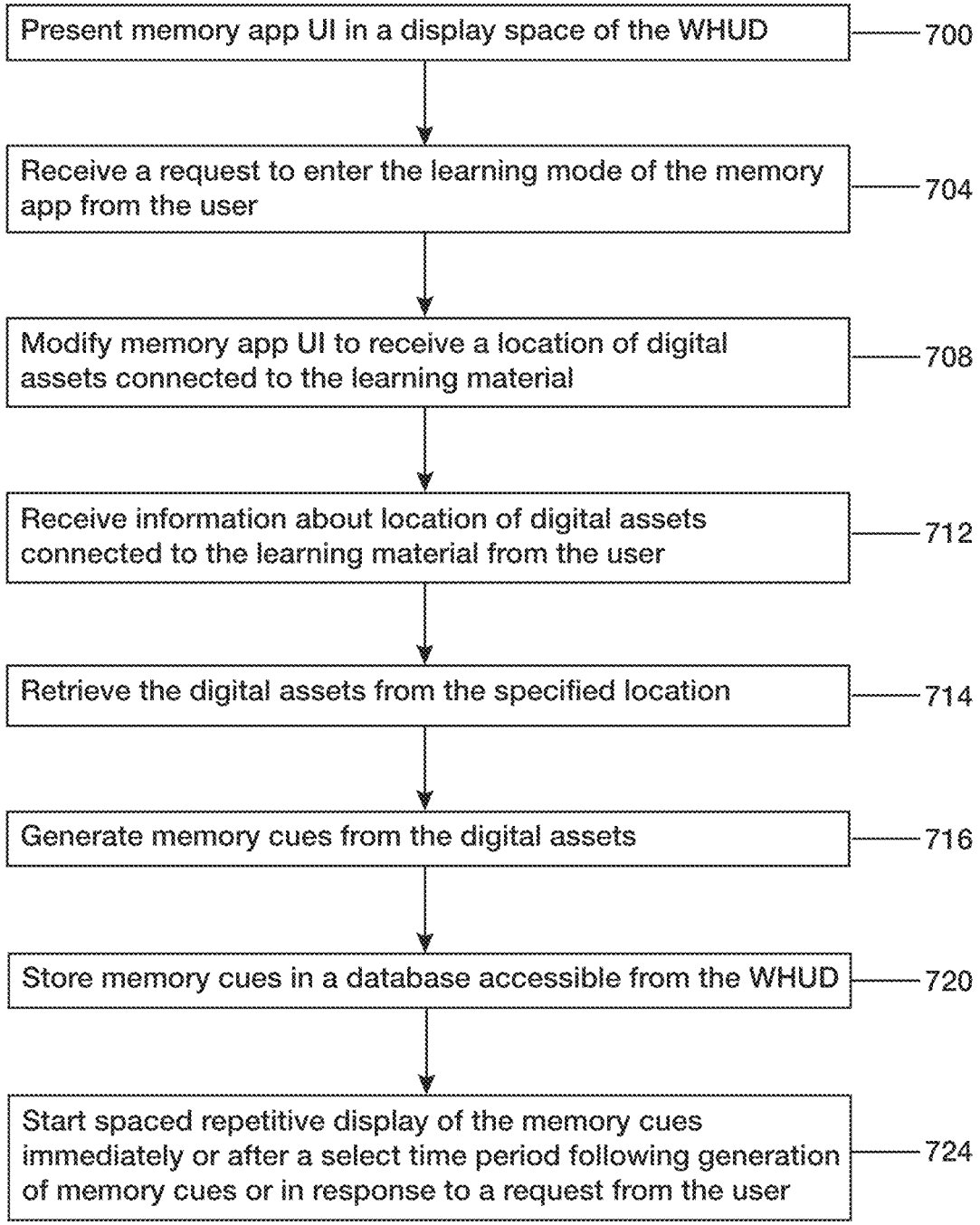
FIG. 7A is a flow chart illustrating one implementation of a method of augmenting a memory of a learning material.
Figures 1, 7B:
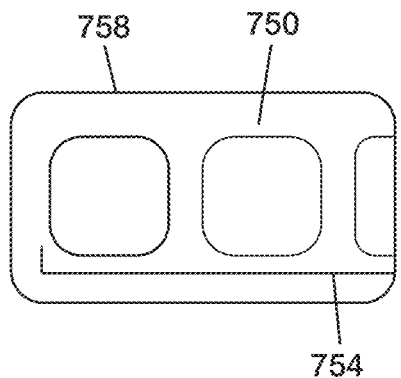
Figures 2, 7B:
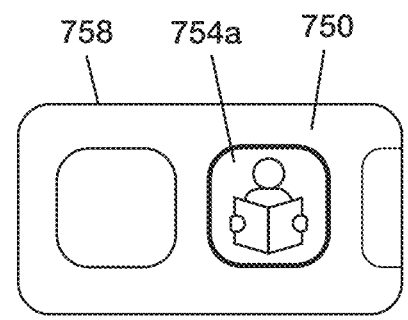
Figures 4, 7B:
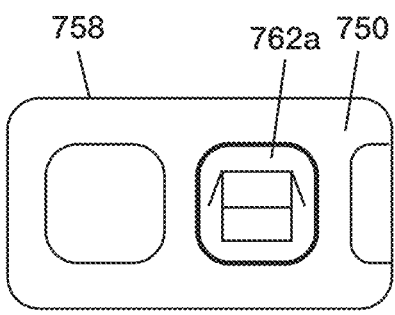
Figures 3, 7B:
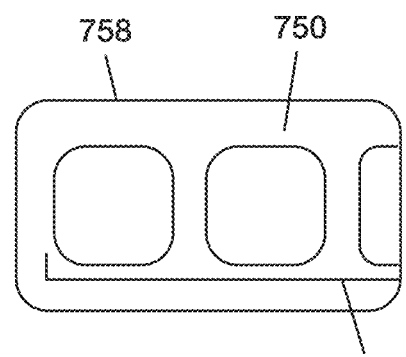
Figures 5, 7B:
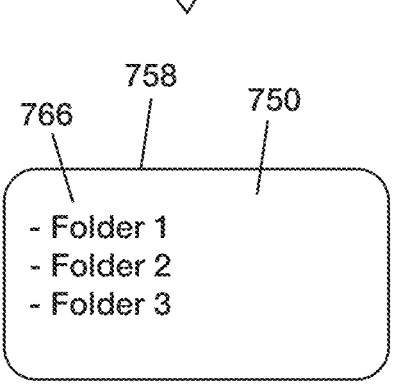
Figures 6, 7B:
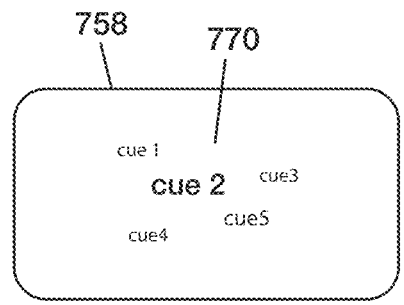

FIG. 7A is a flow chart illustrating a method of augmenting a memory of a learning material, corresponding to "learning mode" of the memory app. At 700, a UI of the memory app is presented in the display space of the WHUD. FIG. 7B-1 shows an example memory app UI 750 with a set of icons 754 in a display space 758 of a WHUD. FIG. 7B-2 shows that an icon 754a corresponding to the learning mode has been selected. Returning to FIG. 7A, at 704, the processor receives a request to enter the learning mode. For the learning mode, the memory app needs to acquire digital assets that describe the learning material for memory data. The digital assets may be any combination of text, photos, audio, and video. The digital assets may be in any location that may be accessed via an appropriate API. For example, the digital assets may be in a folder in a cloud storage, such as Dropbox or Box, or in a repository connected to a book app on a host device, such as Amazon Kindle. At 708, in response to the request to enter the learning mode, the processor may modify the memory app UI to allow the user to specify the location of the digital assets connected to the learning material. In one example, as shown in FIG. 7B-3, the processor may modify the memory app UI 750 to show a set of icons 762 that represent applications from which the user may choose to access digital assets. The user may select a desired application from the set. For example, as shown in FIG. 7B-4, the user may select a cloud storage app 762a having access to digital assets in a cloud. In response to selecting the cloud storage icon 762a, the processor may request a list of folders from the cloud storage app and modify the memory app UI 750 with the list, as illustrated at 766 in FIG. 7B(5). The user may select a folder from the list. The processor may additionally request a list of the contents of the folder from the cloud storage app and modify memory app UI with the list so that the user may select desired digital assets from the list.

Returning to FIG. 7A, at 712, the processor receives information about the location of the digital assets connected to the learning material. At 714, the processor retrieves the digital assets from the specified location. At 716, the processor generates memory cues from the digital assets. The processor may employ any methods suitable for generating memory cues from the digital assets based on the type of digital assets. For example, if a digital asset contains text or mostly text, the processor may extract topics and/or keywords from the text and use the topics and/or keywords as memory cues. If a digital asset is in the form of audio, memory cue(s) may be extracted from the audio as described in connection with the meeting mode. If a digital asset is a video, a clip or an entirety of the video may be a memory cue. If a digital asset is an image, a portion or an entirety of the image may be a memory cue. At 720, the memory cues are stored in a database. At 724, spaced repetition display of the memory cues is used to augment memory of the learning material. Spaced repetition display of the memory cues may begin as soon as or after a predetermined waiting period following generation of the memory cues, or spaced repetition display of the memory cues may begin in response to a request from the user. Spaced repetition display of the memory cues may follow the acts described in FIG. 4. FIG. 7B-6 shows sample cued content 770 in the display space of the WHUD, for illustrative purposes.

Figure 8A:
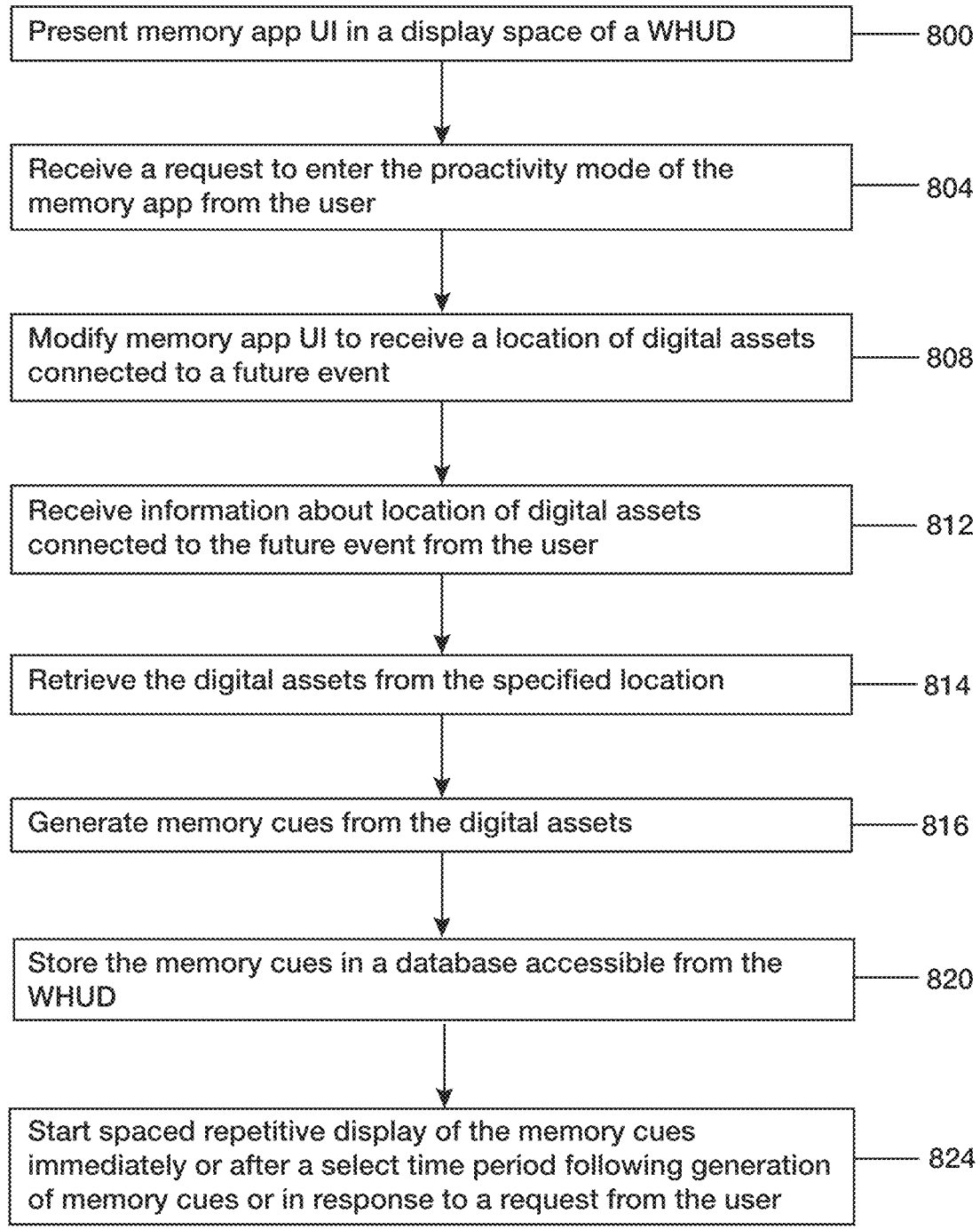
FIG. 8A is a flow chart illustrating one implementation of a method of augmenting a memory of a future event.
Figures 1, 8B:
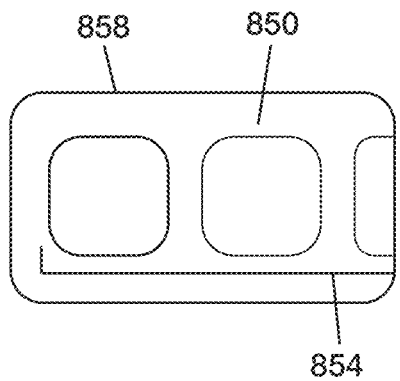
Figures 2, 8B:
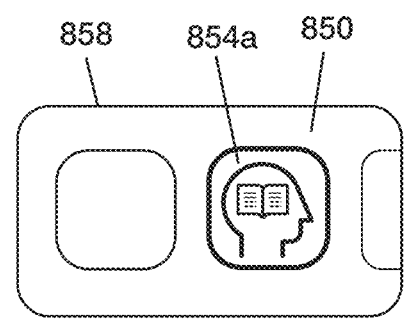
Figures 4, 8B:
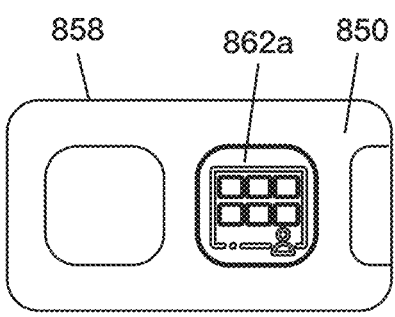
Figures 3, 8B:
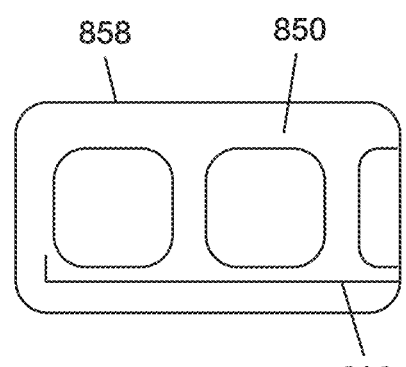
Figures 5, 8B:
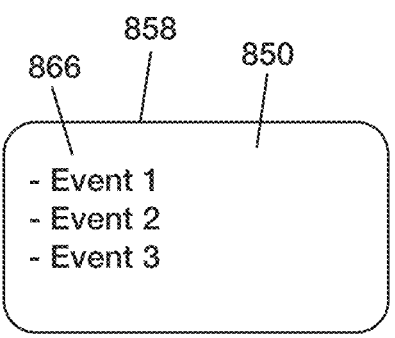
Figures 6, 8B:
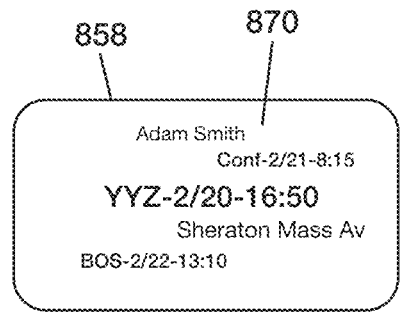

FIG. 8A is a flow chart illustrating a method of augmenting a memory of a future event, corresponding to "proactivity mode." At 800, a memory app UI is presented in the display space of the WHUD. FIG. 8B-1 shows example memory app UI 850 with a set of icons 854 in a display space 858 of a WHUD. FIG. 8B-1 shows that an icon 854*a* corresponding to the proactivity mode has been selected. Returning to FIG. 8A, at 804, the processor receives a request to enter the proactivity mode. For the proactivity mode, the memory app needs to acquire digital assets connected to the future event for memory data. The digital assets may be any combination of text and images. The information contained in the text and images will depend on the type of future event. For example, if the future event is a trip to attend a conference, the information may include flight plans, hotel plans, an agenda for the conference, people to meet at the conference, and the like. The digital assets connected to the future event may be in any location that can be accessed via an appropriate API. For example, the digital assets could be in a repository connected to an event app, or in a repository connected to an email account, or in a repository connected to a cloud storage. At 808, in response to the request to enter the proactivity mode, the processor may modify the memory app UI to allow the user to specify the location of the digital assets connected to the future event.

There are various ways of modifying the memory app UI to allow the user to specify the location of the digital assets. In one example, as shown in FIG. 8B-3, the processor may modify the memory app UI 850 to show a set of icons 862 that represent applications from which the user may choose to access digital assets. The user may select a desired application from the set. For example, as shown in FIG. 8B-4, the user may select an icon 862*a* for an event app having access to digital assets related to the future event. In response to selecting the event app, the processor may request a list of upcoming events from the event app and modify the memory app UI with the list, as illustrated at 866 in FIG. 8B-5. The user may select a desired event from the list.

Returning to FIG. 8A, at 812, the processor receives information about the location of the digital assets connected to the future event. At 814, the processor retrieves the digital assets. At 816, the processor generates memory cues from the digital assets. The processor may employ any methods suitable for generating memory cues from the digital assets based on the type of digital asset. For example, if the digital assets contain text or are mostly text, the processor may generate memory cues by extracting topics and/or keywords from the text and using the topics and/or keywords as memory cues. In the case of events, the topics and/or keywords would be words/characters that describe an event, e.g., dates, flight plans, destinations, and names of people. At 820, the memory cues are stored in a database. At 824, spaced repetition display of the memory cues is used to augment memory of the future event. Spaced repetition display of the memory cues may begin as soon as or after a predetermined waiting period following generation of the memory cues, or spaced repetition display of the memory cues may begin in response to a request from the user. Spaced repetition display of the memory cues may follow the acts described in FIG. 4. FIG. 8B-6 shows sample cued content 870 in the display space 858 of the WHUD, for illustrative purposes.

Figure 9A:
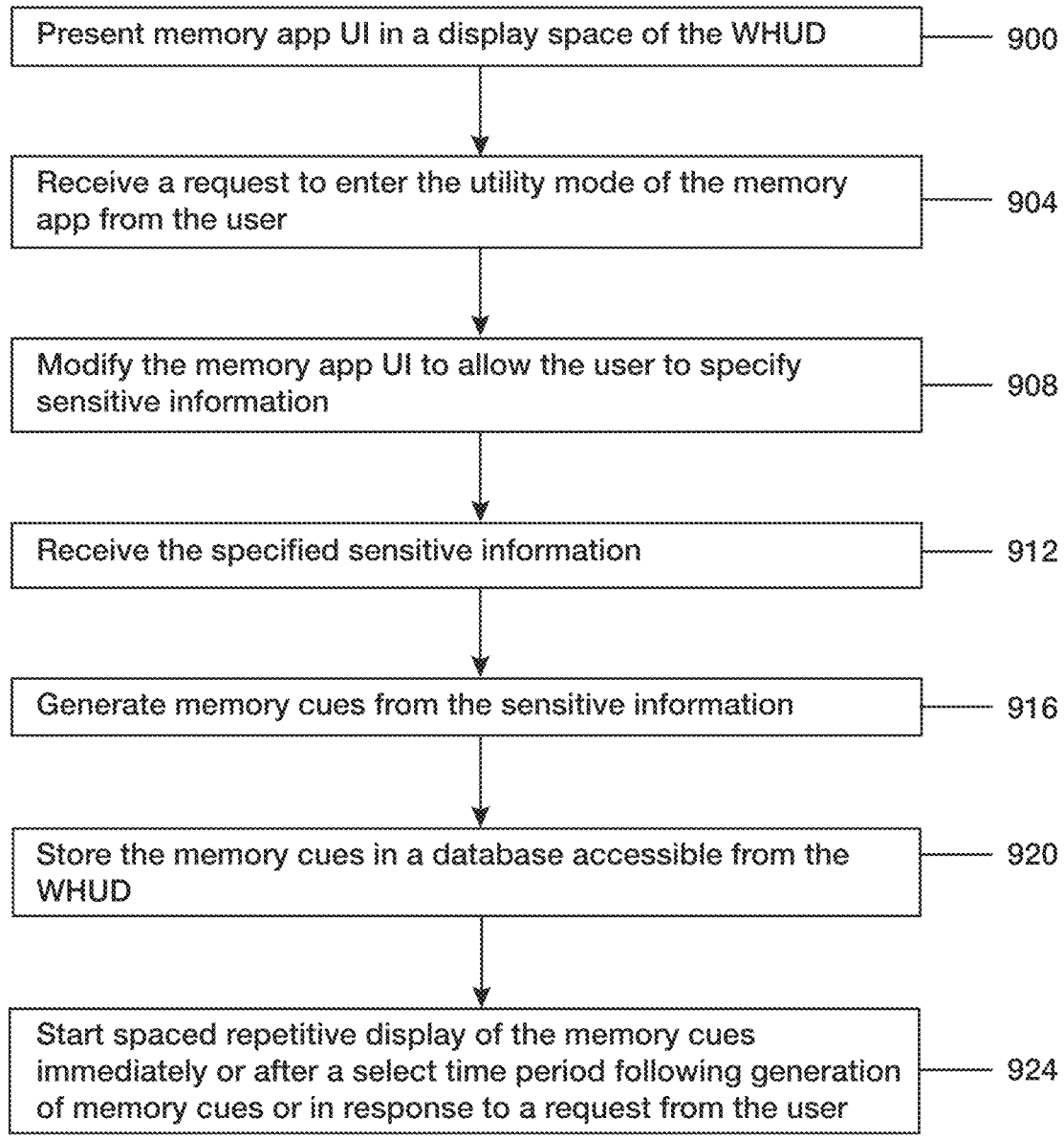
FIG. 9A is a flow chart illustrating one implementation of a method of augmenting a memory of sensitive information.
Figures 1, 9B:
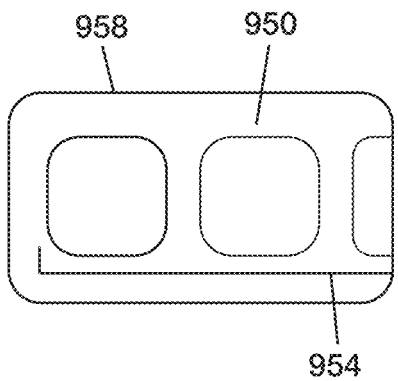
Figures 2, 9B:
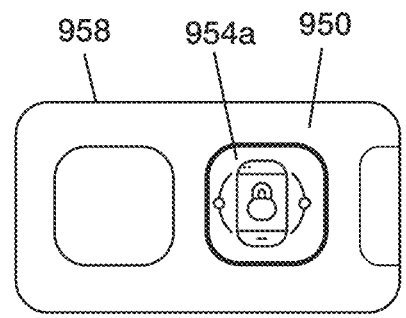
Figures 4, 9B:
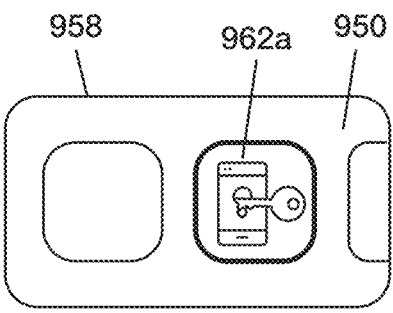
Figures 3, 9B:
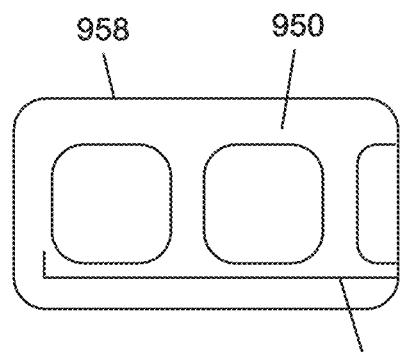
Figures 5, 9B:
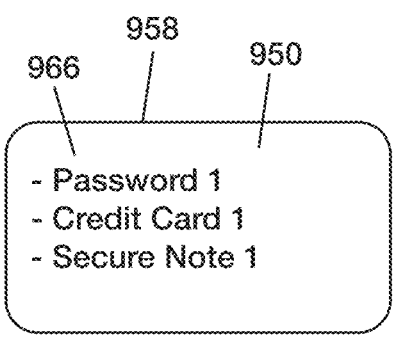
Figures 6, 9B:
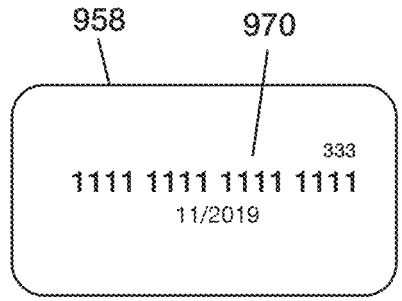

FIG. 9A is a flow chart illustrating a method of augmenting a memory of sensitive information, corresponding to "utility mode." Sensitive information may be, for example, credit card number, password, pass phrase, security code, door pass, and ATM PIN. At 900, a memory app UI is presented in the display space of the WHUD. FIG. 9B-1 shows example memory app UI 950 with a set of icons 954 in the display space 958 of WHUD. FIG. 9B-2 shows that an icon 954*a* corresponding to the utility mode has been selected. Returning to FIG. 9A, at 904, the processor receives a request to enter the utility mode. For the utility mode, the memory app needs to acquire the sensitive information for memory data. The sensitive information would typically be in text form and may be encrypted. The sensitive information may be in any location that can accessed via an appropriate API. For example, the sensitive information could be in a repository connected to a password app, or in a file on a cloud storage. At 908, in response to the request to enter the utility mode, the processor may modify the memory app UI to allow the user to specify the location of the sensitive information.

There are various ways of modifying the memory app UI to allow the user to specify the location of the sensitive information. In one example, as shown in FIG. 9B-3, the processor may modify the memory app UI to show a set of icons 962 that represent applications from which the user may choose to access the sensitive information. The user may select a desired application from the set. For example, as shown in FIG. 9B-4, the user may select an icon 962*a* for a password app having access to the sensitive information. In response to selecting the password app, the processor may modify the memory app UI to show a login screen for the password app. The user may specify the name and password to access information in the password app. The processor may further modify the memory app UI to include a list of sensitive information stored in the password app, as illustrated at 966 in FIG. 9B(5), allowing the user to select the desired sensitive information from the list.

Returning to FIG. 9A, at 912, the processor receives the sensitive information. At 916, the processor generates memory cues from the sensitive information. The processor may employ any methods suitable for generating memory cues from the sensitive information. For example, if the sensitive information is credit card information, the processor may generate memory cues that include the credit card number, the expiration date, and the security code. At 920, the memory cues are stored in a database on the WHUD or that is accessible from the WHUD. At 924, spaced repetition display of the memory cues is used to augment memory of the sensitive information. Spaced repetition display of the memory cues may follow the acts described in FIG. 4. FIG. 9B-6 shows example cued content 970 in the display space of the WHUD, for illustrative purposes.

Figure 10A:
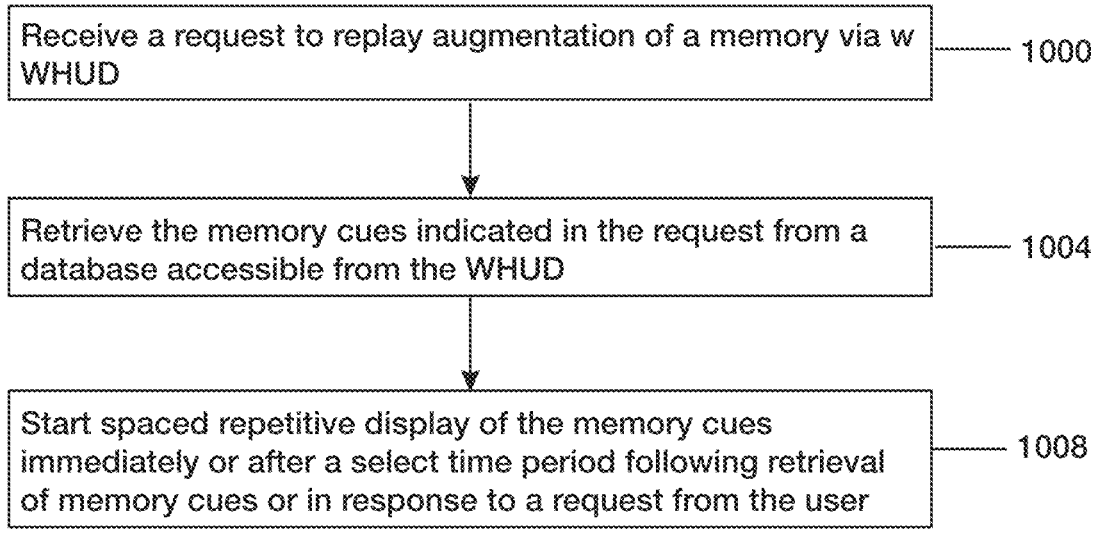
FIG. 10A is a flow chart illustrating one implementation of a method of replaying augmentation of a memory.

Augmentation of a memory M as described above involves generating memory cues connected to memory M and performing a spaced repetition display of the memory cues in a display space in a field of view of the WHUD. In the event that the user does not master recall of the memory at the end of the spaced repetition display, the user may request a replay of the augmentation of the memory. As an example, the user may start the memory app on the WHUD and view a list of memories for which memory cues have been generated. The user may select memory M from the list of memories and request a replay of memory M. FIG. 10A shows a general procedure for replaying augmentation of a particular memory. At 1000, the processor receives a request to replay augmentation of a particular memory. At 1004, the processor retrieves the memory cues related to the memory from a database on the WHUD or that is accessible from the WHUD. At 1008, the processor starts spaced repetition display of the memory cues, e.g., by following the acts described in FIG. 4. The spaced repetition schedule associated with the memory mode may be used for the spaced repetition display at 1008. Alternatively, the spaced repetition mode associated with the memory mode may be adjusted before starting spaced repetitive display of the memory cues at 1008, e.g., if the memory app has learned a spaced repetitive schedule that is more effective than the one used previously.

Figure 10B:
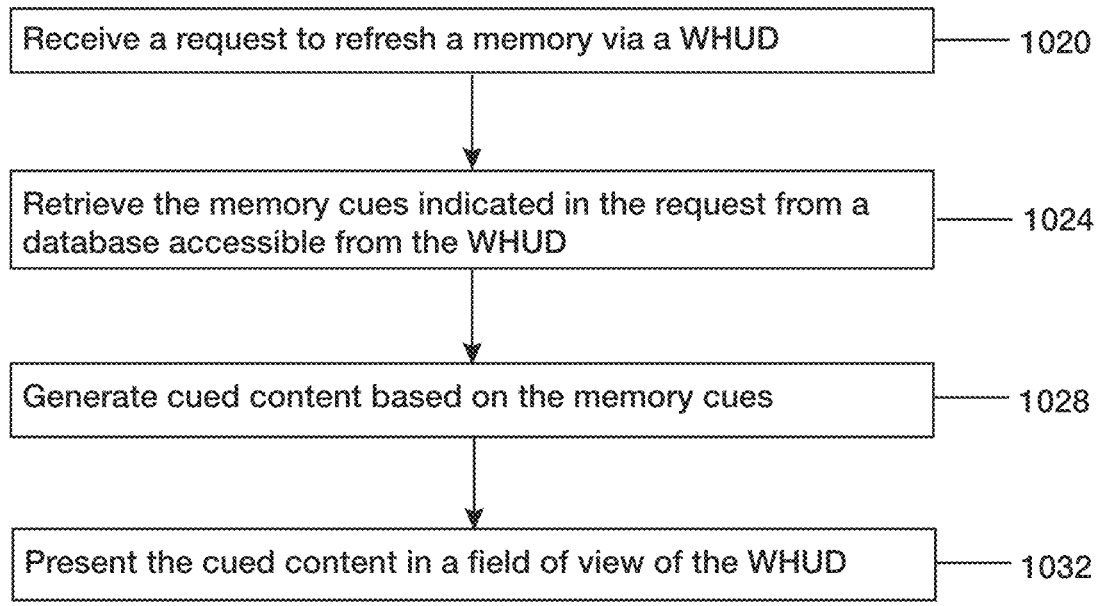
FIG. 10B is a flow chart illustrating one implementation of a method of refreshing a memory.

Other features that the memory app may offer include the ability to refresh a memory rather than replay augmentation of the memory. Refresh of a memory typically includes presenting a single instance of the cued content related to a memory in the display space of the WHUD. A memory may be refreshed in response to a request from a user. Alternatively, refresh of a memory may be triggered when the WHUD is in a particular location related to a memory for which memory cues have been generated. Alternatively, refresh of a memory may be triggered when the system, e.g., a calendar system on the WHUD or on a host device paired with WHUD, generates a reminder of an event related to a memory for which memory cues have been generated. FIG. 10B shows a general procedure for refreshing a memory. At 1020, the processor receives a request to refresh a particular memory. As noted above, the request may come from a user or may be triggered by other stimulus such as location of the WHUD or reminder of a future or past event. At 1024, the processor retrieves the memory cues related to the memory to be refreshed from a database connected to the memory app. The database may be in a memory on the WHUD or in another location accessible from the WHUD. At 1028, the processor generates cued content based on the memory cues. At 1032, the processor presents the cued content in a display space in a field of view of the WHUD. In another implementation, acts 1024 and 1028 may be replaced with a single act of retrieving cued content connected to the memory to be refreshed from the database. For example, the memory app may retain cued content for a period beyond the period required to augment a memory and may have a policy to delete the cued content if within a certain period a request is not made for the cued content. If the request to refresh the memory comes within a period in which the cued content is in the database, the processor may simply retrieve the cued content.

The foregoing detailed description has set forth various implementations or embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation or embodiment, the present subject matter may be implemented via Application Specific Integrated Circuits (ASICs). However, those skilled in the art will recognize that the implementations or embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" or "non-transitory computer-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of pervasive memory augmentation, the method comprising:
    in response to a request to augment a memory received via
        a wearable heads-up display having a field of view, generating one or more processor-readable memory cues that are connected to the memory;

generating a cued content based on the one or more processor-readable memory cues;

presenting the cued content in a display space in the field of view of the wearable heads-up display on a spaced repetition schedule; and pausing presentation of the cued content when notifications are not allowed including at least one of: when a user of the wearable heads-up display is engaged in a face-to-face conversation with another person; at designated times of day; and when the user has set a "do not disturb" mode.

2. The method of claim 1, wherein presenting the cued content in the display space on the spaced repetition schedule comprises presenting the cued content at one of (i) equally spaced time intervals over a set time period, (ii) unequally spaced time intervals over a set time period, and (iii) progressively expanding time intervals over a set time period.

3. The method of claim 1, wherein presenting the cued content in the display space on the spaced repetition schedule begins automatically following generation of the one or more processor-readable memory cues.

4. The method of claim 1, wherein presenting the cued content in the display space on the spaced repetition schedule begins in response to a subsequent request to begin augmenting the memory.

5. The method of claim 1, further comprising apart from presenting the cued content in the display space on the spaced repetition schedule, presenting the cued content in the display space in response to at least one of (a) a request to present the memory cues, (b) a reminder of an event linked to the memory, and (c) detecting that the wearable heads-up display is at a location linked to the memory.

6. The method of claim 1, further comprising repeating presenting the cued content in the display space on the spaced repetition schedule in response to a request to replay augmentation of the memory.

7. The method of claim 1, further comprising acquiring memory data that describes the memory prior to generating the one or more processor-readable memory cues that are connected to the memory.

8. The method of claim 7, wherein acquiring memory data comprises receiving audio data captured in a portion of an environment of the wearable heads-up display by at least one microphone during a period in which the memory is made.

9. The method of claim 8, wherein generating one or more processor-readable memory cues that are connected to the memory comprises:

causing conversion of the audio data to text data;

causing natural language processing of the text data to identify one or more topics and/or keywords in the text data; and causing generation of the one or more processor-readable memory cues from the one or more topics and/or keywords.

10. The method of claim 9, further comprising receiving the audio data from the at least one microphone by a processor of the wearable heads-up display and transmitting the audio data to a remote device, wherein a remote processor associated with the remote device generates the one or more processor-readable memory cues.

11. The method of claim 1, further comprising receiving a location information of one or more digital assets connected to the memory and retrieving the one or more digital assets using the location information, wherein generating one or more processor-readable memory cues that are connected to the memory comprises generating the one or more processor-readable memory cues from the one or more digital assets.

12. The method of claim 11, wherein receiving a location information of one or more digital assets connected to the memory comprises presenting a user interface in the display space to receive the location information.

13. The method of claim 11, wherein retrieving the one or more digital assets using the location information comprises at least one of retrieving a digital asset from an application installed on a host device paired with the wearable heads-up display, retrieving a digital asset from an application hosted on at least one remote server, and retrieving a digital asset from a posting on a social network.

14. The method of claim 1, wherein presenting the cued content in the display space on the spaced repetition schedule comprises modulating an output light of a display light source with at least a portion of the cued content and projecting the output light to the display space.

15. The method of claim 1, wherein the memory indicated in the request to augment a memory is selected from a memory of a meeting, a memory of a past event, a memory of a future event, a memory of learning material, and a memory of sensitive information.

16. A method of pervasive memory augmentation, the method comprising:

in response to a request to augment a memory received via a wearable heads-up display having a field of view, generating one or more processor-readable memory cues that are connected to the memory;

generating a cued content based on the one or more processor-readable memory cues;

presenting the cued content in a display space in a field of view of the wearable heads-up display in response to at least one of (a) a request to present the memory cues, (b) a reminder of an event linked to the memory, and (c) detecting that the wearable heads-up display is at a location linked to the memory; and pausing presentation of the cued content when notifications are not allowed including at least one of: when a user of the wearable heads-up display is engaged in a face-to-face conversation with another person; at designated times of day; and when the user has set a "do not disturb" mode.

17. A system for pervasive memory augmentation, the system comprising:

a wearable heads-up display having a field of view, the wearable heads-up display comprising a display light source, a processor communicatively coupled to the display light source, and a non-transitory processor-readable medium communicatively coupled to the processor, wherein the non-transitory processor-readable medium stores data and/or processor-executable instructions that, when executed by the processor, causes the wearable heads-up display to:

receive a request to augment a memory;

generate one or more processor-readable memory cues that are connected to the memory;

generate a cued content based on the one or more processor-readable memory cues;

present the cued content in a display space in the field of view of the wearable heads-up display on a spaced repetition schedule; and pause presentation of the cued content when notifications are not allowed including at least one of: when a user of the wearable heads-up display is engaged in a face-to-face conversation with another person; at designated times of day; and when the user has set a "do not disturb" mode.

18. The system of claim 17, further comprising at least one sensor to capture a sensory input in an environment of the wearable heads-up display.

19. The system of claim 17, further comprising a support frame that in use is worn on a head of a user, wherein the display light source and processor are carried by the support frame.

20. The system of claim 17, wherein the display light source is a scanning laser projector, a micro-display, or a digital light processing projector.

* * * * *